United States Patent [19]

Shimizu et al.

[11] Patent Number: 4,842,837

[45] Date of Patent: Jun. 27, 1989

[54] PROCESS FOR PRODUCING FINE SPHERICAL SILICA

[75] Inventors: Takaaki Shimizu; Toshihiro Okon, both of Joetsu, Japan

[73] Assignee: Shin-Etsu Chemical Co., Ltd., Tokyo, Japan

[21] Appl. No.: 98,301

[22] Filed: Sep. 18, 1987

[30] Foreign Application Priority Data

Sep. 19, 1986 [JP] Japan ................. 61-221569

[51] Int. Cl.$^4$ ............................................. C01B 33/12
[52] U.S. Cl. .................................... 423/335; 423/338; 423/339
[58] Field of Search ......................... 423/338, 339, 385

[56] References Cited

FOREIGN PATENT DOCUMENTS

| 4943897 | 4/1974 | Japan | 423/338 |
| 0064542 | 4/1984 | Japan | 423/338 |
| 0107938 | 6/1984 | Japan | 423/338 |
| 384053 | 2/1988 | Japan | 423/338 |

OTHER PUBLICATIONS

W. Stoeber, et al., "Controlled Growth of Monodisperse Silica Spheres in the Micron Size Range," Journal of Colloid and Interface Science, 26, 62–69 (1968).

T. Shimohira, et al., "Synthesis of Monodispersed Spherical Silica," Japan Chemical Society [9], 1503–1505 (1981), Abstract only.

K. Shimada, et al., "Studies on the Properties of Amorphous Silica Having Some Connection with Volcanic Action and its Industrial Application," Rept. XXXIII Synthesis of Opal-Like Material (I), Kagoshima University, Technology Department Research Rept. No. 24, pp. 115–122 (1982), Abstract only.

K. Shimada, et al., "Studies on the Properties of Amorphous Silica Having Some Connection with Volcanic Action and its Industrial Application," (Rept. 34) Synthesis of Opal-Like Material (II), Kagoshima Univ., Technology Dept. Research Rept. No. 26 (1984), pp. 53–59, Abstract only.

Primary Examiner—John Doll
Assistant Examiner—Lori S. Freeman
Attorney, Agent, or Firm—Foley & Lardner, Schwartz, Jeffery, Schwaab, Mack, Blumenthal & Evans

[57] ABSTRACT

A process for producing fine spherical silica, comprising a step of hydrolyzing an alkoxysilane in a mixed solution comprising water and alcohol and containing an alkaline catalyst, wherein the amount of said alkaline catalyst is 0.5 to 10 in molar ratio to the alkoxysilane used, the concentration of water in said mixed solution of water and alcohol in 5 to 20 mol/lit., and the reaction temperature for said hydrolysis is 30° C. or more.

According to this process, there can be obtained highly monodisperse spherical silica containing only a very small amount of impurities and having a particle size of 100 nm or less.

16 Claims, 1 Drawing Sheet

PROCESS FOR PRODUCING FINE SPHERICAL SILICA

BACKGROUND OF THE INVENTION

1. Field of the Invention

This invention relates to a process for producing fine spherical silica, and, particularly, to a process for producing fine spherical silica containing only a very small amount of impurities and having a particle size of 100 nm or less.

2. Description of Prior Art

Known processes for producing fine spherical silica include the following:

(1) A process in which flame hydrolysis or burning oxidation of silane compounds such as $SiCl_4$, $CH_3SiCl_3$, $CH_3Si(OCH_3)_3$, $Si(OCH_3)_4$, $Si(OC_2H_5)_4$, and the like is carried out;

(2) A process in which an aqueous sodium silicate solution is subjected to ion-exchange to synthesize ultrafine colloidal silica, followed by Ostwalt growing; and (3) A process in which an alkoxysilane such as $Si(OCH_3)_4$ and $Si(OC_2H_5)_4$ is subjected to wet hydrolysis at room temperature in the presence of an acidic or alkaline catalyst in a mixed solvent of water/alcohol [Journal of Colloid and Interface Science, 26, 62–69 (1968); Japan Chemical Society [9], 1503–1505 (1981); Kagoshima University, Technology Department Research Report [24], 115–122 (1982); and the same Report [26], 53–59 (1984)].

However, the silica particles obtained by Process (1) have a particle size of 200 to 500 nm, which is more than 10 times greater than the particle size of the particles obtained by Process (2). Also, this process, which is carried out by gaseous phase synthesis, can only produce silica with a low collection efficiency of about 50% at most, resulting in lower productivity. In addition, since association among particles may occur in the flame, it is difficult to obtain the so-called monodisperse spherical silica in which the particles having uniform particle size are each present in a mutually free state. According to Process (2), very fine and monodisperse silica having a particle size of 10 to 20 nm can be obtained in the state that particles are dispersed in water. However, in this process, which requires sodium silicate as a starting material, an H-type ion-exchange resin must be used or silicic acid serving as a nucleus having a particle size of 1 nm or less must be grown to a particle of the size of 10 nm; therefore the process is complicated and has poor productivity. Moreover, although the silica finally obtained can take the form such that particles are dispersed in water, it inevitably contains impurities such as Na originating from the starting sodium silicate and acid radical Cl or $SO_4$ added at a step during the process for the purpose of adjusting the pH, as well as Al, in an amount of 10 to 1,000 ppm. Such a product can not be satisfactory for use in electronic materials. For example, as a use of the colloidal silica obtained by this process, there is known a polish used for silicon wafers for semiconductors or semiconductor wafers made of compounds such as GaAs or GdGa garnet. However, it has become clear that, as semiconductors have been made more highly integrated, the metals such as Na or Cl components in the colloidal silica may contaminate the wafers to adversely affect the performances of a device.

In contrast to these Processes (1) and (2), in Process (3), which is a process by which highly monodisperse fine spherical silica can be obtained as colloidal silica in the manner similar to Process (2), a high quality substance containing only a very trace amount of metals can be used as a starting material and solvent, and a volatile substance such as HCl and $NH_3$ can be used as a catalyst. Accordingly, the impurities originating from the starting materials or the like can be in a very small amount, and the operation and apparatus for the wet hydrolysis can be simple and achieve high productivity. Thus, this is a good process. This process has also a feature that the resulting silica can be of porous structure.

However, when the colloidal silica is used as a polish for semiconductor wafers, it is required, in addition to the smallness in the impurity content, to have a particle size of 100 nm or less, preferably 50 nm or less. However, the colloidal silica obtained by the above Process (3) has a particle size of as large as 200 nm or more, and therefore there is a problem that it can not attain a desired polished surface.

SUMMARY OF THE INVENTION

Accordingly, an object of this invention is to provide a process for producing with high productivity, a highly monodisperse fine spherical silica containing only a very small amount of impurities and having a particle size of 100 nm or less.

This invention provides a process for producing fine spherical silica, comprising a step of hydrolyzing in alkoxysilane in a mixed solution comprising water and alcohol and containing an alkaline catalyst, wherein the amount of said alkaline catalyst is 0.5 to 10 in molar ratio to the alkoxysilane used, the concentration of water in said mixed solution of water and alcohol is 5 to 20 mol/lit., and the reaction temperature in said hydrolysis is 30° C. or more.

The process according to this invention can produce with high productivity, a highly monodisperse fine spherical silica containing only a very small amount of impurities and having a particle size of 100 nm or less. The particle size of the resulting silica can also be controlled with ease, and those having a particle size of 50 nm or less can also be produced with ease. This silica is suitable as a polish for semiconductor wafers such as silicon wafers, and can prevent the contamination of the wafers at the time of polishing.

DETAILED DESCRIPTION OF THE INVENTION

Figure 1:
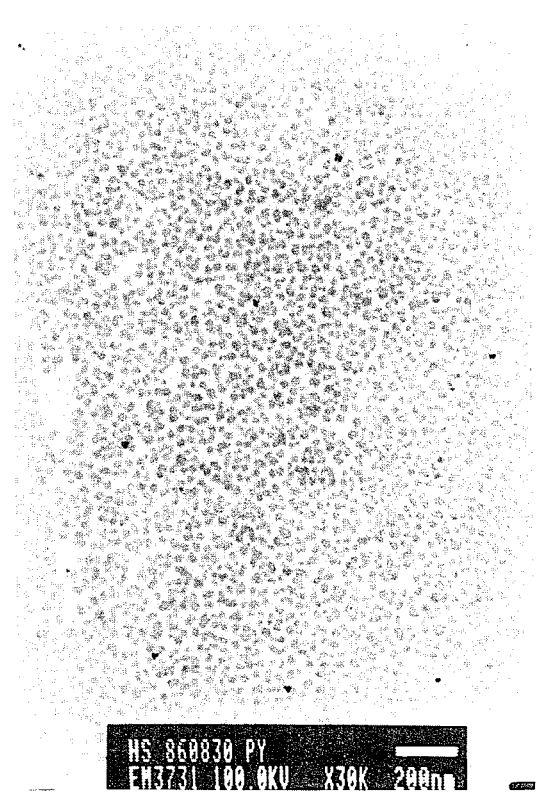
FIG. 1 is an electron microphotograph (50,000 magnification) of silica particles obtained in Example 1.

The hydrolysis of alkoxysilane in the process of this invention may be carried out usually by introducing the starting alkoxysilane into a water/alcohol mixed solution containing the aforesaid alkaline catalyst.

The alkoxysilane used as a starting material in this invention may include the compound represented by the general formula:

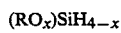

wherein R may be the same or different and represents an alkyl group such as methyl, ethyl, propyl and butyl; and x represents an integer of 1 to 4.

In the above general formula, the alkoxysilane wherein x is 1 to 3 is highly reactive, or dangerous, because of generation of $H_2$ gas at the time of the hydrolysis. Accordingly, x is preferably 4. In the tetraalkoxysilane corresponding to the compound wherein x is 4, the particle size of the formed silica may become larger with increase in the carbon atom number of the alkyl group. Accordingly, preferred are those in which the alkyl group is a methyl group or an ethyl group, in order to produce spherical silica having a particle size or 100 nm or less, particularly 50 nm or less.

To introduce the alkoxysilane into the water/alcohol mixed solution, it may be, for example, dropwise added to the mixed solution as it is or as a suitable alcohol solution, but desirably diluted and used as an alcohol solution to obtain spherical silica having uniform particle size. The alcohol used here may be the same as, or different from, the one used in the water/alcohol mixed solution.

The alkoxysilane may preferably be used in an amount of 0.1 to 5 mol/lit., particularly preferably 0.2 to 1 mol/lit., based on the whole reaction mixture, in other words, based on the total amount of the water/alcohol mixed solution containing an alkaline catalyst and the alkoxysilane introduced thereinto (including a solvent when introduced as a solution). If it is used in an amount of less than 0.1 mol/lit., the concentration of alkoxysilane in the reaction mixture is so low that the formed silica particles can have a smaller particle size, but an excessively large reaction volume may become necessary, lowering the productivity and resulting in a poor economical advantage. If it is used in an amount more than 5 mol/lit., the concentration in the reaction mixture is so high that association between particles may occur to lower the dispersibility, sometimes producing a precipitate to cause phase separation of silica.

The alcohols in the water/alcohol mixed solution used in this invention, include, for example, lower alcohols such as methanol, ethanol, n-propanol, i-propanol, n-butanol, etc. However, the silica to be formed may have a greater particle size and at the same time may have a decreased solubility to water with increase in the carbon atom number, and, as a result, it may gradually become difficult to produce highly monodisperse spherical silica of 100 nm or less, particularly 50 nm or less, having uniform particle size. It is also necessary to afterward remove alcohol by evaporation when it is intended to obtain dispersed-in-water colloidal silica. Thus, the lower the boiling point is, the more preferred. Accordingly, preferred are methanol and ethanol. On the other hand, the water in the water/alcohol mixed solution is used in concentration of 5 to 20 mol/lit., preferably 8 to 15 mol/lit. The concentration less than 5 mol/lit. may result in a slow reaction rate of the hydrolysis, and that more than 20 mol/lit. may cause a lowering of the solubility of a silicic acid oligomer which is an intermediate product formed by hydrolysis of alkoxysilane in the course of the formation of the fine spherical silica, resulting in a lowering of the dispersibility to form precipitated silica. The water may preferably be used in an amount 1.2 times or more the theoretical amount (or stoichiometric amount) necessary for the hydrolysis of alkoxysilane. For example, when tetraalkoxysilane is used, the theoretical amount of the necessary water is 2 time molar amount of the tetraalkoxysilane, and it is desirable to use the water in 2.5 time molar amount. The amount of water less than 1.2 times the theoretical amount may result in difficulty in achieving rapid hydrolysis.

The alkaline catalyst that can be used in this invention may include, for example, ammonia and alkylamines such as monoalkylamine, dialkylamine and trialkylamine (wherein the alkyl include, for example, methyl, ethyl, propyl and butyl). However, the alkylamines may result in a slow reaction rate of the hydrolysis, and may act as a coagulant to promote the association between silica particles, depending on the concentration. Accordingly, most suitable is ammonia that has good reactivity, has no action as mentioned above, and at the same time has higher volatility and can be readily removed afterward. This alkaline catalyst is used in an amount of 0.5 to 10, preferably 1 to 5, in molar ratio to the alkoxysilane used. If this molar ratio is less than 0.5, silica may be dispersed in the form of such overly-fine particles that it is impossible to impart to the particle surface an electrical charge necessary for the silica to be present in a stable form and therefore particles may be mutually associated in the course of the reaction or after the reaction to form a gel. If this molar ratio is more than 10, it is difficult to make the silica particle to be formed finer, even by controlling the reaction temperature to 30° C. or more as mentioned below, and thus it is impossible to obtain monodisperse spherical silica having a particle size of 100 nm or less.

In the process of this invention, the hydrolysis of alkoxysilane (and substantially simultaneously accompanying condensation of formed silanol or the like) may be carried out at the reaction temperature controlled to 30° C. or more, preferably 30° to 50° C., and particularly preferably 35° to 45° C. The reaction temperature less than 30° C. results in silica comprising particles having a particle size exceeding 100 nm. In the process of this invention, it is possible to control the particle size of the resulting highly monodisperse fine spherical silica by controlling the reaction temperature. The higher the reaction temperature is made, the smaller the particle size becomes. In general, ultrafine particles of a particle size of 10 nm or less are formed at 50° C. or higher to make it unsuitable to be used for a polish for semiconductor wafers. Thus, it is possible to control the particle size depending on the use. Additionally speaking, the above-mentioned amount of the alkaline catalyst and amount of water also have a relation to the particle size of the silica fine particles to be obtained. Accordingly, in order to keep a constant particle size, it is necessary to control the temperature together with these factors. In other words, when the amount of alkali is increased (or decreased), the temperature must be shifted to the side of higher (or lower) temperature, and when the amount of water is increased (or decreased), to the side of lower (or higher) temperature. The particle size is so susceptible to the temperature that the temperature must be strictly controlled.

The process of this invention is carried out by slowly introducing an alkoxysilane or a mixed solution thereof with an alcohol, into a water/alcohol mixed solution containing an alkaline catalyst, kept at a constant temperature of 30° C. or more under sufficient stirring. Here, stirring with sufficiently high shear force is desired, as it can achieve the production of particles having good dispersibility. Insufficient stirring may result in formation of precipitated silica, i.e., silica wherein the particles have been coagulated. Also, if the water/alcohol mixed solution is kept in an open system, the alcohol and alkaline catalyst may be evaporated as the temperature is kept at 30° C. or higher, resulting in continual variation of the concentration of these to make it impossible to produce silica particles with good reproducibility. Accordingly, the process is preferably carried out with the water/alcohol mixed solution kept in a closed system. Since the hydrolysis is carried out at a high temperature, the time necessary for the silica to have the intended particle size can be as short as several minutes. However, the temperature and the stirring conditions are preferably kept unchanged for a period of about 15 to 30 minutes after completion of the introduction of alkoxysilane.

As a result of the hydrolysis and condensation reaction explained in the above, the fine spherical silica can be obtained in the form of colloidal silica. To make dispersed-in-water colloidal silica, the alcohol used as a solvent may be removed by taking measures such as vacuum distillation. It is also possible to obtain dried powdery silica by removing water and alcohol.

In the process of this invention, the mechanism by which an alkoxysilane is formed into silica particles is such that the monomer having a silanol group, formed by the hydrolysis of the scheme (1) as shown below, grows into an oligomer, into a polymer and into an ultrafine particle with gradual increase in the molecular amount (or condensation degree) through the reaction in which the silanol groups mutually or a silanol group and an alkoxy groups undergo condensation as shown in scheme (2) or (3), and is finally formed into silica particles having the size that can be viewed by an electron microscope.

$$Si(OR)_4 + XH_2O \longrightarrow Si(OH)_x(OR)_{4-x} + XROM \quad (1)$$

$$\equiv Si-OH + HO-Si\equiv \longrightarrow \equiv Si-O-Si\equiv + H_2O \quad (2)$$

$$\equiv Si-OH + RO-Si\equiv \longrightarrow \equiv Si-O-Si\equiv + ROH \quad (3)$$

In the prior art (aforesaid Process (3)), it was impossible to stop this growth at an arbitrary stage, leaving the particles to finally grow into those having a particle size of 200 nm or more. However, according to the process of this invention, there can be obtained monodisperse spherical silica by controlling the temperature for the hydrolysis and condensation to 30° C. or more. The elevation of the reaction temperature may increase the coordination rate of anionic ions such as $NH_4^+$ on the surface of a silica particle more than it increases the reaction rates of the hydrolysis and condensation, so that the particles are ionically stabilized in the state of a low condensation degree, i.e., in the state of very small particle size, having the action to stop the growth thereof to the size greater than that. Therefore, it is presumably possible to obtain the silica particles having the desired size by varying the temperature.

The fine spherical silica obtained by the process of this invention is useful as reinforcing silica for silicone hard-coating and molding compounds, and an additive for anti-slip agent for fiber, etc., in particular, a polish for semiconductor wafers such as silicon wafers because the product is highly monodisperse fine spherical silica containing only a very small amount of impurities and having a particle size of 100 nm or less.

EXAMPLES

This invention will be described below in greater detail by Examples, but by no means limited to these.

Example 1 and Comparative Example

In a 500 cc glass flask equipped with a dropping funnel, a thermometer and a turbine stirring blade, 36.3 cc of water, 118.2 cc of methanol and 10.7 cc of 28 wt.% ammonia water were charged, to provide a closed system. The water bath temperature was controlled to and kept at 40° C. with stirring. This solution had a water concentration of 12.2 mol/lit. While keeping the temperature in the flask at 40±0.2° C. and stirring vigorously, a mixed solution comprising 15.2 g of tetramethoxysilane and 20 cc of methanol was dropwise added from the dropping funnel over a period of 30 minutes. With progress of the addition, there was seen how the reaction mixture in the flask began to become turbid in slightly white. After completion of the addition, the temperature and stirring were kept for 20 minutes as they were, followed by cooling, and the stirring was stopped. The reaction mixture in the flask was turbid in pale white, but in such a degree that it was seen through. At this time, the amount of tetramethoxysilane based on the whole reaction mixture was 0.5 mol/lit., and the molar ratio of ammonia ($NH_3$) to tetramethoxysilane was 1.59.

Next, this silica sol solution was vacuum-distilled until the final liquid temperature reached 51° C. to remove ammonia and methanol. The resulting concentrated solution had the pH of 8.0, without observation of any precipitated silica. It was very homogeneous, and, though somewhat turbid in white, had very high transparency. The particle size of this silica was measured by turbidimetry to be 25 nm, and observation by an electron microscope revealed highly monodisperse spherical particles as seen from the photograph shown in FIG. 1. Also, the amount of metallic impurities contained therein was measured by ICP emission spectroscopic analysis and the amount of cations was measured by ion chromatography to obtain the results shown in Table 1. As a comparative example, similar measurement was carried out on a commercially available silica (trade name, SSS; produced by Nissan Chemical Industries, Ltd.) to obtain the results also shown together in Table 1.

TABLE 1

|  | Example 1 | Comparative Example |
|---|---|---|
| Fe | <0.01 ppm | 6.5 ppm |
| Al | <0.01 ppm | 203 ppm |
| Na | 0.05 ppm | 830 ppm |
| Cl | 0 ppm | 5.2 ppm |
| $SO_4^{2-}$ | 0.9 ppm | 4.7 ppm |

Examples 2 to 4

Colloidal silica was prepared using the apparatus and procedures same as those in Example 1 except that the reaction temperature was controlled to 35° C., 38° C. and 43° C., respectively. The particle size thereof was measured to obtain the results shown in Table 2.

TABLE 2

|  | Example 2 | Example 3 | Example 4 |
|---|---|---|---|
| Temperature (°C.) | 35 | 38 | 43 |

TABLE 2-continued

|  | Example 2 | Example 3 | Example 4 |
|---|---|---|---|
| Particle size (nm) | 63 | 42 | 17 |

What we claim is:

1. A process for producing highly monodisperse fine spherical silica having a particle size of 100 nm or less, comprising a step of hydrolyzing an alkoxysilane in a mixed solution comprising water and alcohol and containing an alkaline catalyst, wherein the amount of said alkaline catalyst is 0.5 to 10 in molar ratio to the alkoxysilane used, the concentration of water in said mixed solution of water and alcohol is 5 to 20 mol/lit., and the reaction temperature in said hydrolysis is 30° C. or more.

2. The process of claim 1, wherein said alkoxysilane is represented by the general formula:

$$(RO_x)SiH_{4-x}$$

wherein R may be the same or different and represents an alkyl group, and x represents an integer of 1 to 4.

3. The process of claim 2, wherein said alkoxysilane is tetraalkoxysilane represented by the general formula:

$$(RO)_4Si$$

wherein R may be the same or different and represents an alkyl group.

4. The process of claim 3, wherein said alkoxysilane is tetraalkoxysilane represented by the general formula:

$$(RO)_4Si$$

wherein R may be the same or different and represents a methyl group or an ethyl group.

5. The process of claim 1, wherein said alkoxysilane is dropwise added in said mixed solution in the form of an alcohol solution.

6. The process of claim 1, wherein said alkoxysilane is used in an amount of 0.1 to 5 mol/lit. based on the whole reaction mixture.

7. The process of claim 1, wherein the alcohol in said mixed solution is a lower alcohol selected from the group consisting of methanol, ethanol, n-propanol, i-propanol and n-butanol.

8. The process of claim 7, wherein the alcohol in said mixed solution is methanol or ethanol.

9. The process of claim 1, wherein the water in said mixed solution is in concentration of 8 to 15 mol/lit.

10. The process of claim 1, wherein the amount of water used is 1.2 times or more the stoichiometric amount necessary for the hydrolysis of the alkoxysilane.

11. The process of claim 1, wherein said alkaline catalyst is ammonia or alkylamine.

12. The process of claim 1, wherein said alkaline catalyst is used in an amount of 1 to 5 in molar ratio to the alkoxysilane used.

13. The process of claim 1, wherein the reaction temperature in said hydrolysis of alkoxysilane is 30° to 50° C.

14. The process of claim 1, wherein said alkaline catalyst is ammonia.

15. The process of claim 1, wherein said alkoxysilane is used in an amount of 0.2 to 1 mol/liter, based on the whole reaction mixture.

16. The process of claim 1, wherein the reaction temperature in said hydrolysis of alkoxysilane is 35° to 45° C.

* * * * *